United States Patent
Gold

[11] Patent Number: 5,864,439
[45] Date of Patent: Jan. 26, 1999

[54] VAN LIGHT-REFLECTING DISPLAY

[76] Inventor: Peter Gold, 465 N. Wood Rd., Rockville Centre, N.Y. 11570

[21] Appl. No.: 767,975

[22] Filed: Dec. 17, 1996

[51] Int. Cl.[6] .............................. G02B 7/182; G02B 5/08; G02B 27/00; G02B 5/12

[52] U.S. Cl. .................... 359/871; 359/609; 359/527; 359/528; 359/533; 359/839

[58] Field of Search ................................ 359/871, 609, 359/527, 528, 533, 839

[56] References Cited

U.S. PATENT DOCUMENTS 5,163,731  11/1992  Gold ............................... 296/201
6,617,366   5/1996  Togino ............................. 359/858

*Primary Examiner*—Cassandra C. Spyrou
*Assistant Examiner*—Mohammad Y. Sikder
*Attorney, Agent, or Firm*—Myron Amer P.C.

[57] ABSTRACT

An added light display for alerting traffic passing left and right of a moving or parked van consisting of a light-reflecting strip advantageously positioned in a gap about the window which serves as a weather barrier compartment protecting the strip against deterioration due to weather elements and ultraviolet light impingement and permits it to provide a rectangular light display.

1 Claim, 1 Drawing Sheet

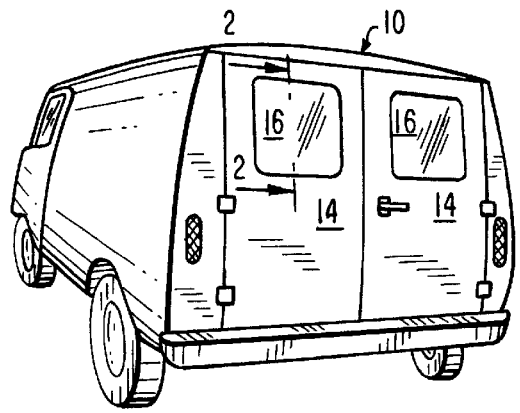
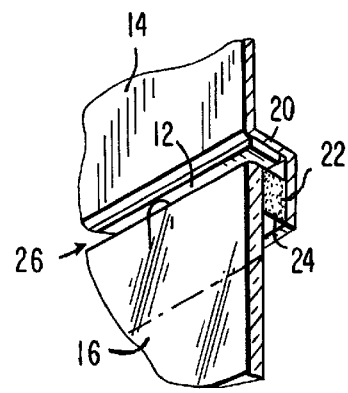
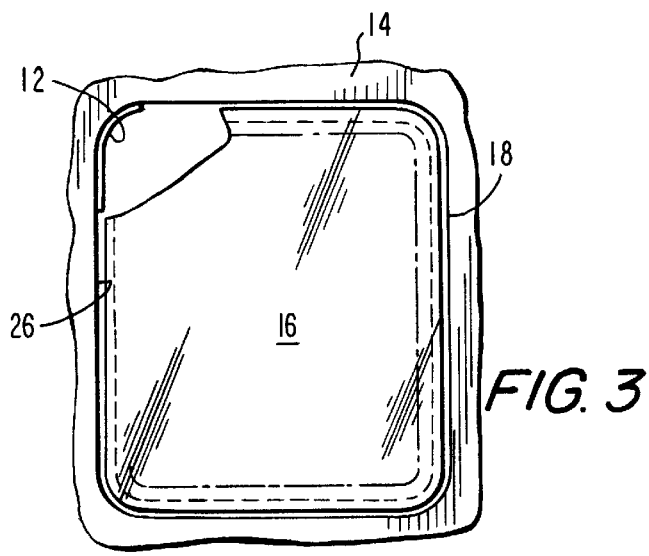
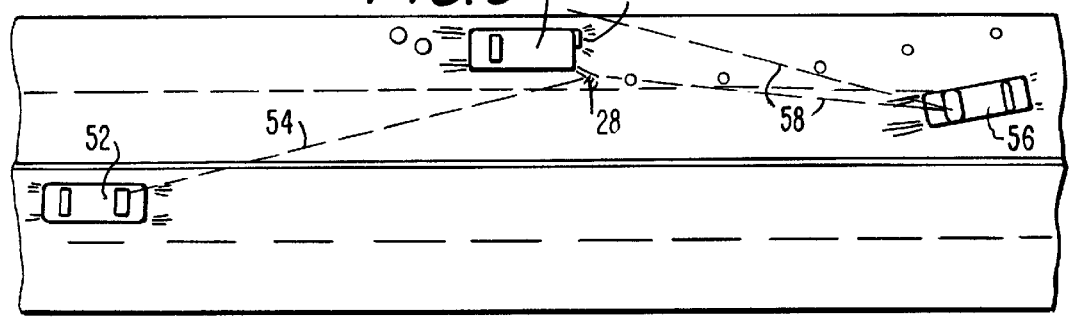

VAN LIGHT-REFLECTING DISPLAY

The present invention generally relates to motor vehicle safety, and more particularly to a light display for an industrial van primarily for traffic passing the van during its operation or when parked and being loaded and unloaded.

EXAMPLES OF THE PRIOR ART

At night and other conditions of reduced visibility, a traffic circumstance in which motor vehicles are operated at different speeds requires on a slower travelling motor vehicle a light display noting it as a road obstacle to an approaching or passing vehicle. This is especially so for an industrial van which when parked is loaded and unloaded from the rear.

Thus, in addition to tail lights mandated by law, an industrial van is, by current practice, provided with a supplementing rear light display, either battery-operated as noted in my prior U.S. Pat. No. 5,441,324 and U.S. Pat. No. 5,523,926, or using light-reflecting tape or strip means reflecting back the light of headlights impinging upon the strip means from approaching or passing traffic, as noted in my prior U.S. Pat. No. 5,163,731. In a light-reflecting light display, of which the light display hereof is intended as an improvement, the '731 patent calls for locating the light-reflecting strip in a display compartment to provide protection against physical deterioration by weather elements and to minimize chemical deterioration by exposure thereof to actinic light. Providing a display compartment was heretofore specially embodied structure, with attendant cost.

SUMMARY OF THE INVENTION

Broadly, it is an object of the present invention to provide a protected light-reflecting light display overcoming the foregoing and other shortcomings of the prior art.

More particularly, it is an object to convert an unused gap involved in the sealing of the peripheral edge against weather elements of the rearwardly facing van windows into a light display compartment for a light-reflecting strip, thus providing a supplementing light display contributing to safer use of the van at nominal expense and effort, all as will be better understood as the description proceeds.

DESCRIPTION OF THE PREFERRED EMBODIMENT

The description of the invention which follows, together with the accompanying drawings should not be construed as limiting the invention to the example shown and described, because those skilled in the art to which this invention appertains will be able to devise other forms thereof within the ambit of the appended claims.

FIG. 1 is a perspective view of an industrial van to which there has been provided a light display according to the present invention;

FIG. 2 is a cross sectional view taken along line 2—2 of FIG. 1 illustrating structural details of the light display;

FIG. 3 is a front elevational view of a rear window of the van of FIG. 1 in which the light-reflecting strip component, for simplicity, is illustrated partly in phantom perspective;

FIG. 4 is a partial perspective view of details of the light display as seen in the direction of the arrows 4—4 of FIG. 2; and FIG. 5 is a view depicting traffic conditions in which the within light display contributes to safety in the use of the van.

Light displays provided by materials with a known chemical content which reflect back light from the headlights of approaching traffic are already in use on the rear of motor vehicles, such as the within industrial van 10, and contribute to a safer use of the van, particularly during the loading and unloading of the van.

The within inventive light display in the specific form of a light-reflecting strip 12 is primarily for traffic, as noted at 52 and 56, in the act of passing the van 10 and having headlight beams 54, 58 noting the van as an object to be avoided in the directional movement of the autos 52, 56 and now, in accordance with the present invention, supplementing the display of the van 10 with reflected light as noted at 28 and 29.

To the above end, van 10 is of the type having rear left and right doors 14, each having a stationary installed rearwardly facing window 16. Also typical, each window 16 is slightly undersized for the window opening in which it is installed, such window opening 18 being bounded by a vertical flange 20, as oriented in relation to the plane of the window opening 18, which is integral to a horizontally oriented flange 22 on which the window is bonded in place by cured urethane 24. The window opening 18 is slightly oversized in relation to the selected size of the window 16, thus providing a gap 26 between the flange wall 20 which is an outboard location in relation to the peripheral edge 30 of the window 16 which is in an inboard location in facing relation or clearance position from the flange wall 20.

Underlying the present invention is the recognition that the gap 26 serves as a light-display compartment in encircling relation about the window 16 in which the light-reflecting strip 12 is advantageously positioned protected against deterioration by the weather elements. Yet, at an angular line of sight, corresponding to the angular transmission 54 of the headlight beams of the approaching traffic 52, 56, the light-reflecting strip 12 adhesively secured to the flange wall 20 is clearly visible to the drivers of the autos 52, 56 in the traffic circumstances depicted in FIG. 5, since the reflected light is not obstructed from serving as a light display by the physically interposed peripheral edge 30 of the window 16 because this edge, like the entire window 16, is of a light-transmitting glass construction.

There is thus provided an additional safety feature, in the way of the light display 28, 29, by using to advantage a heretofore unused gap 26 as a light display compartment for a light-reflecting strip 26 which, moreover, is readily manually positioned for display through the access to the flange wall 20 provided by the gap opening 26.

While the light display herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A light display for a van comprising:
   a van window having a face surrounded by an edge;
   a flange member having a first flange portion, a second flange portion and a third flange portion;
   each of said first, second and third flange portions extending between a first and second end;
   said first and third flange portions being parallel to the face of the window; said second flange portion being perpendicular to said face of said window;

said first end of said second flange portion attached to said second end of said first flange portion and said second end of said second flange portion attached to said first end of said third flange portion;

said first end of said first flange portion bonded to said face adjacent to said edge such as to provide a gap between said second flange portion and said edge;

a light-reflecting strip positioned within said gap;

whereby light transmitted by headlights passing the van along an angular line of sight is unobstructed by said edge of said window and impinges on and is reflected by said light-reflecting strip.

\* \* \* \* \*